(12) United States Patent
Katz et al.

(10) Patent No.: US 6,921,129 B2
(45) Date of Patent: Jul. 26, 2005

(54) VEHICLE, ESPECIALLY A MULTIPURPOSE VEHICLE

(75) Inventors: Egon Katz, Nagold (DE); Juergen Wonney, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/416,343

(22) PCT Filed: Oct. 31, 2001

(86) PCT No.: PCT/EP01/12608

§ 371 (c)(1),
(2), (4) Date: Nov. 17, 2003

(87) PCT Pub. No.: WO02/38412

PCT Pub. Date: May 16, 2002

(65) Prior Publication Data

US 2004/0100113 A1 May 27, 2004

(30) Foreign Application Priority Data

Nov. 11, 2000 (DE) .......................................... 100 56 043

(51) Int. Cl.⁷ .............................................. B62D 25/20
(52) U.S. Cl. .............................. 296/193.07; 296/37.14; 296/65.09; 296/75
(58) Field of Search ........................ 296/184.1, 193.07, 296/37.14, 37.15, 37.16, 65.16, 69, 65.09, 75

(56) References Cited

U.S. PATENT DOCUMENTS

| | | | |
|---|---|---|---|
| 1,161,420 A | 11/1915 | Snelling | |
| 1,441,388 A | 1/1923 | Vanier | |
| 1,648,205 A | 11/1927 | Vanier | |
| 6,682,120 B2 * | 1/2004 | Kamida et al. | .......... 296/65.09 |
| 2004/0041431 A1 * | 3/2004 | Ito et al. | .................. 296/65.16 |

FOREIGN PATENT DOCUMENTS

DE 4106506 5/1993

OTHER PUBLICATIONS

Search Report.

* cited by examiner

Primary Examiner—Jason Morrow
(74) Attorney, Agent, or Firm—Crowell & Moring LLP

(57) ABSTRACT

The invention relates to a vehicle, in particular a station wagon, having a rear loading space which has a floor trough and having an additional seat which is arranged foldably in the rear loading space and has a pivotably held seat and backrest part, the rear sides of which, in the folded-over not-in-use position of the additional seat, form a flat loading floor which covers the floor trough. In order to realize a footrest for the vehicle occupant sitting on the additional seat counter to the direction of travel, a covering module is inserted into the floor trough, said covering module having a self-supporting, flat plate which is used for the footrest and a strip-shaped, narrow limb which is angled on one longitudinal side of the plate. The plate is supported at the edges at a distance from the bottom of the floor trough, and the limb extends vertically until it reaches or is close to the front edge of the seat part of the additional seat.

17 Claims, 3 Drawing Sheets

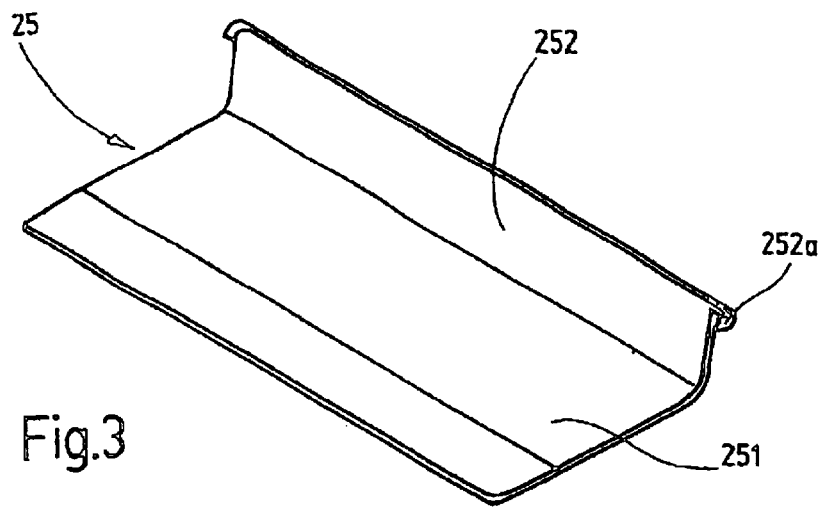
Fig.3
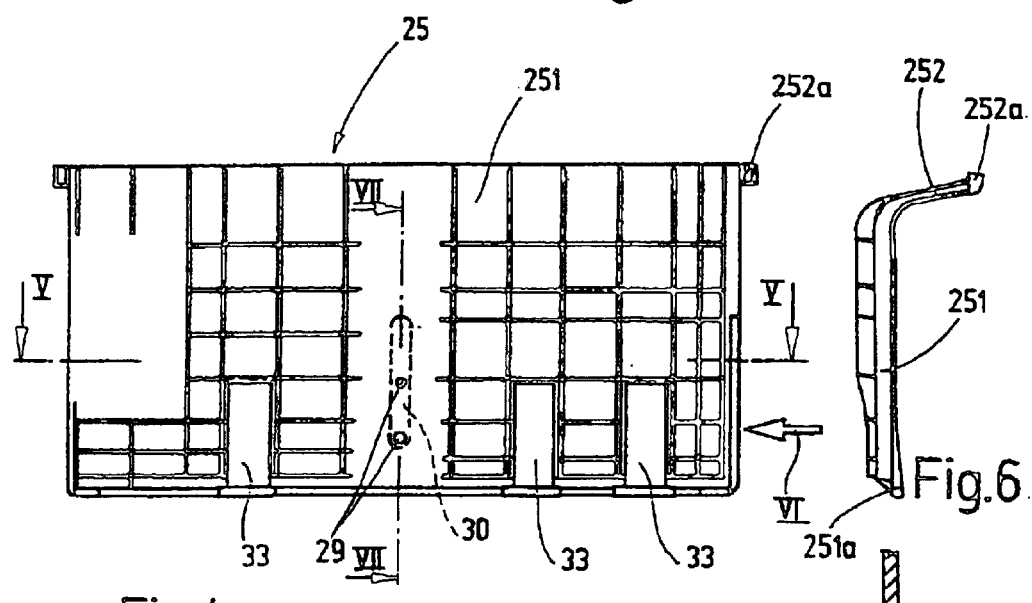
Fig.4
Fig.5
Fig.6
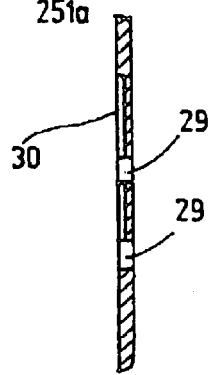
Fig.7

VEHICLE, ESPECIALLY A MULTIPURPOSE VEHICLE

This application claims priority to International Patent Application No. PCT/EP01/12608, filed Oct. 31, 2002, designating the United States of America, and German Application DE 100 56 043.1 filed on Nov. 11, 2000, the entire disclosure of which is incorporated herein by reference.

BACKGROUND SUMMARY OF THE INVENTION

The invention relates to a vehicle, in particular a station wagon and to a covering module for installation in a vehicle.

In the case of a known vehicle of this type (DE 41 06 506 C2), which is provided with an additional seat, which is used as additional seating, for example for children, and is arranged in the actual loading space of the vehicle, the footrest for a vehicle occupant sitting on the additional seat counter to the direction of travel is realized in the body shell of the vehicle by a plastic tray being inserted into the vehicle floor, said plastic tray being used as a foot well for accommodating the feet of the vehicle occupant. The foot well is covered by a carpet which is extendible, gastight and tear-resistant. If the plastic tray is additionally used for accommodating the spare wheel of the vehicle, then, after the spare wheel has been inserted, a fixed plate is laid on top of it, the plate being covered, for its part, by the carpet and being used as a footrest for the vehicle occupant. However, it has to be accepted that if the replacement wheel is missing a footrest is no longer provided.

The invention is based on the object of realizing, in the case of a vehicle of the type mentioned at the beginning, a permanent footrest even if the vehicle is not provided with a footrest formation in the body shell or this is not possible, as is the case, for example, when the floor trough is used as a space for accommodating the replacement wheel.

The vehicle according to the invention has the advantage that the use of a simple component in the vehicle enables a footrest to be provided at all times, said footrest either being permanently installed or, if there is the necessity to gain access to a storage space below the footrest, for example for a replacement wheel, said component being designed in a manner such that it can be lifted up or pivoted away. In addition, in addition to its covering and foot-supporting function, a covering module of this type may also be assigned a storage function if, according to a preferred embodiment of the invention, the narrow limb of the covering module, which limb is angled from the plate, is used for the attachment of holding means for objects, such as a net, elastic pocket etc., and/or in the case of the pivotable arrangement of the covering module, storage containers are also provided on the lower side of the plate. The covering module having its three functions of footrest, floor trough covering and holding objects then constitutes a multi-functional module.

According to one advantageous embodiment of the invention, the narrow limb, which is angled from the plate, is designed in its limb width in such a manner that a seat cushion, which is arranged on the seat part, can be accommodated by the covering module when the seat part is folded over to form the loading floor and, in this case, is bounded on the one side by the plate and on the other side by the limb. The folding capability of the vehicle seat for producing a flat loading floor is thereby in no way adversely affected and the seat cushion of the seat part is kept free from dirt when the loading space is being used.

In the case of a pivotable arrangement of the covering module for the purpose of opening up a holding space below the plate, for example for a spare wheel, according to one advantageous embodiment of the invention the covering module is fastened by its plate on a longitudinal strut which spans the floor trough in the longitudinal direction of the vehicle, is supported on a transverse member, which runs in the outer rear and is held at its end, which faces away from the rear, on the vehicle in a manner such that it can pivot about a pivot axis running transversely with respect to the longitudinal direction of the vehicle. This longitudinal strut, which is preferably produced from an aluminum section and is also referred to as the Y0 strut, serves, in the case of a rear-end crash, additionally as a support in the longitudinal direction of the vehicle for the purpose of preserving leg room for the vehicle occupant sitting on the additional eat.

According to one advantageous embodiment of the invention, the fastening of the plate of the covering module, which plate rests with its lower side on the longitudinal strut, is undertaken by means of at least one screw connection. A longitudinal groove is incorporated in the plate, preferably on its upper side facing away from the longitudinal strut, said groove extending from a fastening hole for the screw connection in the longitudinal direction of the longitudinal strut in a direction away from the rear over a defined length. This "crash groove" prevents material fractures on the covering module if, in the event of a rear-end collision, the covering module is pushed under the seat part of the additional seat in the longitudinal direction of the vehicle.

According to one advantageous embodiment of the invention, the upper edge of the limb of the covering module, which edge faces away from the plate, is designed as a support for the loading floor part formed by the folded-over backrest part of the additional seat. This results in improved stability for the loading floor.

BRIEF DESCRIPTION OF THE DRAWINGS

The invention is described in greater detail below with reference to an exemplary embodiment illustrated in the drawing, in which, in a schematic illustration:

FIG. 3 shows a perspective illustration of the covering module in FIGS. 1 and 2, FIG. 4 shows a view from below of the covering module in FIG. 3, FIG. 5 shows a section along the line V—V in FIG. 4, FIG. 6 shows a side view of the covering module in the direction of the arrow VI in FIG. 4, FIG. 7 shows part of a section along the line VII—VII in FIG. 4.

DETAILED DESCRIPTION OF THE DRAWINGS

Figure 1:
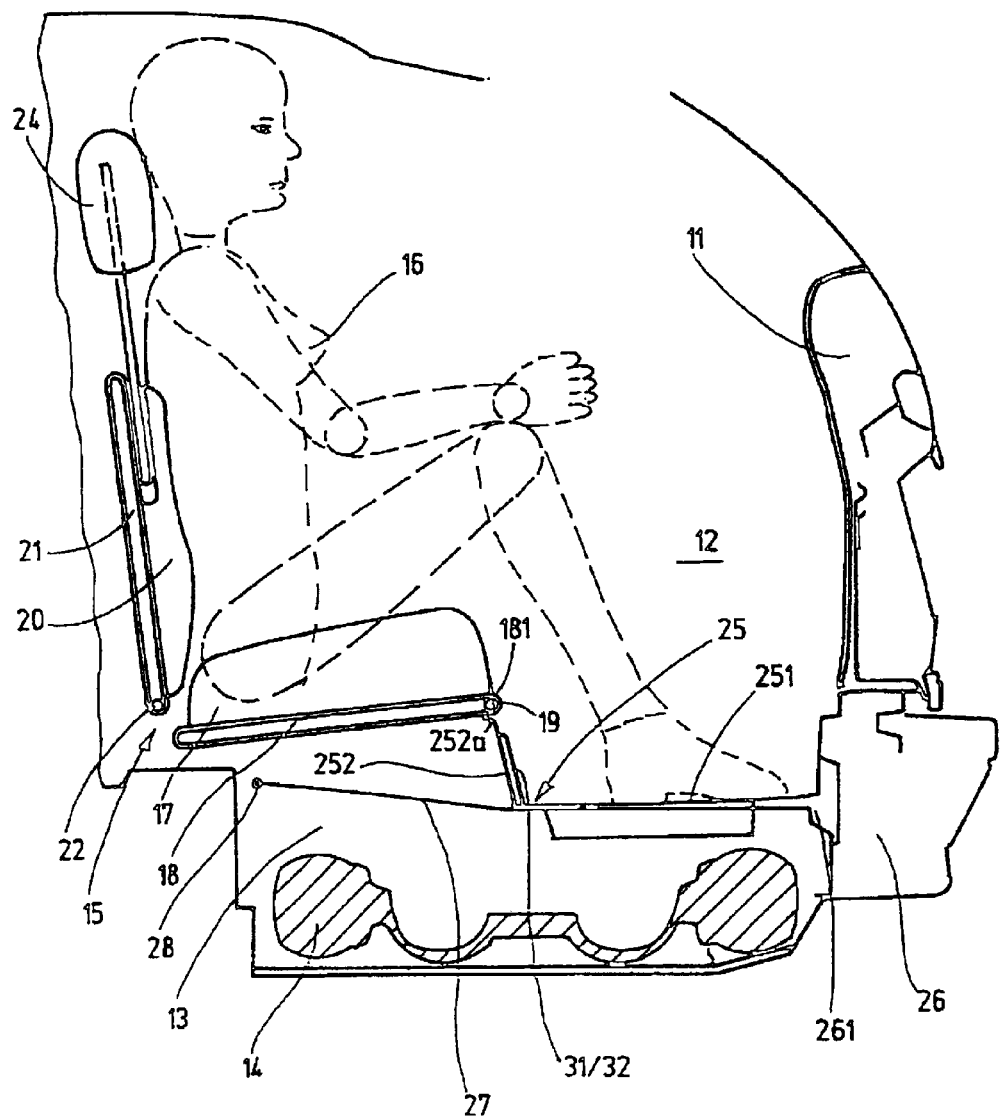
FIG. 1 shows part of a longitudinal section of the rear region of a station wagon with an additional seat which is set up in the use position and is occupied by a vehicle occupant.
Figure 2:
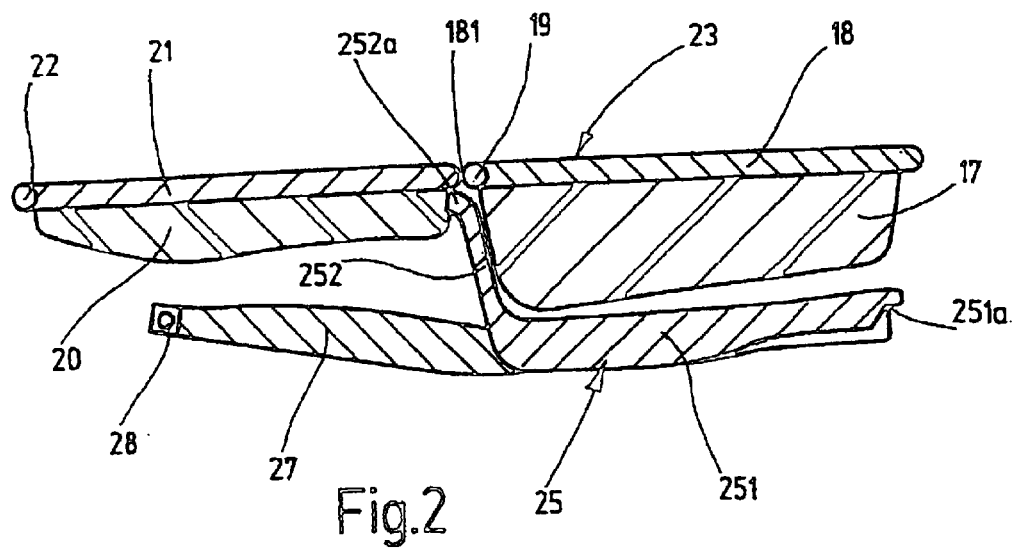
FIG. 2 shows a longitudinal section of the vehicle seat, which is folded over into its not-in-use position, together with a covering module mounted in front of the seat part.

The station wagon, part of the rear region of which is illustrated in FIG. 1 in longitudinal section, as an exemplary embodiment for a motor vehicle has a rear loading space 12 which is at the rear end and reaches from the back seats (not illustrated) of the vehicle as far as the rear door 11 and has a floor trough 13, which is arranged directly behind the rear door 11, for holding a replacement or spare wheel 14. In the rear loading space 12 an additional seat 15 which can be folded away is arranged in such a manner that a vehicle occupant 16 sitting on it sits counter to the direction of travel with a view through the rear window of the rear door 11. The additional seat 15 has a seat part 18 which is padded by a seat cushion 17 and can be pivoted through approximately 180° forward in the direction of the rear door 11 about a pivot axis 19, which is fixed in the vehicle on the front edge of the seat part 18, and a backrest part 21 which is provided with a backrest pad 20 and can be pivoted through approximately 90° forward about a pivot axis 22 which is arranged on the lower edge of the backrest part 21 and is fixed in the vehicle. If the seat part 18 and backrest part 21 are folded forward about their pivot axes 19 and 22, their rear sides, which face away from the seat surface, form a flat loading floor 23 which covers the floor trough 13 (FIG. 2). A height-adjustable head restraint 24 is also held in the backrest part 21.

In order to realize a footrest for the vehicle occupant 16 sitting on the additional seat 15, a covering module 25 is provided, which covering module is illustrated in various views and sections in FIGS. 3–7, has a large plate 251, which covers the floor trough region 13 mounted in front of the additional seat 15, and a strip-shaped, narrow limb 252 which is integrally angled away from the plate 251 on the longitudinal side of said plate, which side faces the additional seat 15. In the fitted state, the self-supporting, flat plate 251 is supported at the edges in the floor trough 13 at a distance from the bottom 131 of the floor trough 13, specifically, at one end, on a projection 261, which is integrally formed on a transverse member 26 running below the rear door 11 (FIG. 1), and, at the other end, on lining parts (not illustrated in FIG. 1) of the floor trough 13, said lining parts adjoining said floor trough laterally on the left and right. The limb 252 extends approximately vertically upward and reaches as far as or close to the front edge 181 of the seat part 18 of the additional seat 15. The distance of the plate 251 from the trough bottom 131 and the width of the limb 252 in the vertical direction are configured in such a manner that the seat cushion 17, which is arranged on the seat part 18, is accommodated by the covering module 25 when the seat part 18 is folded over to form the loading floor 23, with the front side of the seat cushion 17 being covered by the plate 18 and the lower edge of the seat cushion 17 being covered by the limb 252 (FIG. 2). The free end 252a of the limb 252, which end faces away from the plate 252, is designed in such a manner that the backrest part 21, which is folded over in order to form the loading floor and from which the head restraint 24 has been pulled off beforehand, rests with its upper edge on the limb end 252a and is therefore additionally supported by the covering module 25.

The covering module 25 is arranged pivotably in the floor trough 13 in order to ensure access to the spare wheel 14. As an alternative, the covering module 25 may also be able to be lifted upward out of the floor trough 13 or, if there is no usable space below the covering module 25, may be permanently installed in the floor trough 13.

In the pivotable arrangement of the covering module 25 according to FIG. 1, the covering module 25 is fastened by its plate 251 on a longitudinal strut 27 which spans the floor trough 13 in the longitudinal direction of the vehicle and is illustrated schematically in FIG. 1 and in a structural embodiment in FIG. 2. As is indicated schematically in FIG. 1, the longitudinal strut 27 is supported at its rear end on the transverse member 26 and is fixed at its front end, which faces away therefrom, on the vehicle in a manner that it can pivot about a pivot axis 28. The longitudinal strut 27, which is formed by an aluminum section and is also, since it is arranged centrally, referred to as the Y0 strut, serves, in the case of a rear-end crash, additionally as a support for preserving leg room in front of the additional seat 15. As can be seen in FIGS. 4 and 7, the plate 251 has, in the center, two fastening holes 29 which are spaced apart from each other in the longitudinal direction and through which a respective fastening screw (not illustrated here) can be passed in order to screw the covering module 25 to the longitudinal strut 27. The plate 251 is placed here onto the upper side of the longitudinal strut 27. As is illustrated by dashed lines in FIG. 4, a longitudinal groove 30 is incorporated in the upper side of the plate 251, said longitudinal groove extending from the fastening hole 29 which is situated closer to the rear door 11 by a defined length in the longitudinal direction beyond the other fastening hole 29. This longitudinal groove 20, which is incorporated in the upper side of the plate 251, can also be seen in the sectional illustration of FIG. 7. This longitudinal groove 30, which is also referred to as a crash groove, is used for preventing material fractures on the covering module 25 and therefore for reducing the risk of injury to the vehicle occupant 16 if, in the event of a rear-end crash, the covering module 25 is pushed forward under the erected seat part 18.

Figure 8:
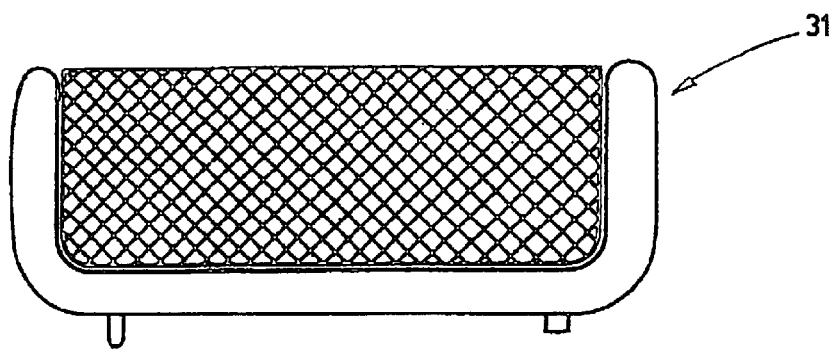
FIG. 8 shows a plan view of a storage net on the covering module.
Figure 9:
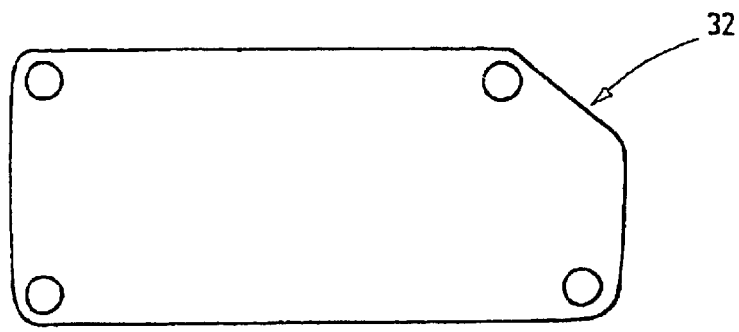
FIG. 9 shows a plan view of a storage pocket on the covering module.

The covering module 25 is additionally also provided with storage possibilities. As is indicated schematically in FIG. 1, a storage net 31 or a storage pocket 32, as can be seen in plan view in FIGS. 8 and 9, is arranged on the narrow limb 252 of the covering module 25. In this case, the entire length of the narrow limb 252 can be spanned by a storage net 31 or a storage pocket 32. However, two storage nets 31 or two storage pockets 32 or one storage net 31 and one storage pocket 32 can be fastened next to one another on the narrow limb 252. It is therefore possible for elongate, narrow objects and, in the case of the elastically expandible design of the storage net 31 and storage pocket 32, also for more bulky objects to be inserted between the storage nets 31 or the storage pockets 32 and the long limb 252. As is illustrated in FIGS. 4 and 5, storage trays 33 are also arranged on the lower side of the plate 251 and are accessible when the covering module 25 is pivoted upward. These storage trays 33 may be able to be pulled out in the manner of a drawer or else may be designed such that they can be placed onto the lower side of the plate 251, with the result that they have to be pulled off from the plate 251 in order to be filled or emptied and then have to be clipped back onto the plate 251.

The covering module 25 is preferably produced from sheet metal or plastic and has a supporting surface 251a which runs around the edges of the plate 251 and is recessed in the region of the angled limb 252. This supporting surface 251a, which can be seen in FIGS. 2 and 7 on that longitudinal side of the plate 251 which faces the transverse member 26, is used for supporting the plate 251 at the edges in the floor trough 13, as has already been described.

What is claimed is:

1. A vehicle, having a rear loading space which has a floor trough, having an additional seat which is arranged foldably in the rear loading space and has a pivotable seat part and pivotable backrest part, the rear sides of which, which face away from the seat surface, form, in a folded-over not-in-use position of the additional seat, a flat loading floor which covers the floor trough, and having a footrest, mounted in front of the seat part, for at least one vehicle occupant sitting on the additional seat counter to the direction of travel, characterized by a covering module having a self-supporting, flat plate which is used for the footrest and is supported at the edges on the floor trough at a distance from the bottom of the floor trough in a manner covering the latter in the region in front of the additional seat, and having a strip-shaped, narrow limb which is angled on one longitudinal side of the plate, which side faces the additional seat, and extends approximately vertically until it reaches or is close to the front edge of the seat part of the additional seat.

2. The vehicle as claimed in claim 1, characterized in that that width of the limb which points in the vertical direction is dimensioned in such a manner that a seat cushion, which is arranged on the seat part, can be accommodated by the covering module, bounded by the plate and limb, as the seat part is folded over to form the loading floor.

3. The vehicle as claimed in claim 1, characterized in that the covering module is permanently installed in the rear loading space.

4. The vehicle as claimed in claim 1, characterized in that the covering module is arranged pivotably or is designed in a manner such that it can be lifted upward in order to open up the floor trough space covered by the plate.

5. The vehicle as claimed in claim 4, characterized in that the covering module is fastened by its plate on a longitudinal strut which spans the floor trough in the longitudinal direction of the vehicle, is supported on a transverse member, which runs at the edge of the rear, and is held at its other end, which faces away from the rear, on the vehicle in manner such that it can pivot transversely with respect to a pivot axis running in the longitudinal direction of the vehicle.

6. The vehicle as claimed in claim 5, characterized in that the fastening of the plate, which rests with its lower side on the longitudinal strut, is undertaken by means of at least one screw connection, and in that a longitudinal groove is incorporated into the plate said longitudinal groove extending from a fastening hole for passing through the at least one screw connection in a direction away from the rear over a defined length of the transverse strut.

7. The vehicle as claimed of claim 4, characterized in that storage trays which can be slidably actuated are arranged on the lower side of the plate.

8. The vehicle as claimed in claim 1, characterized in that at least one storage net or a storage pocket is fastened to the narrow limb of the covering module.

9. The vehicle as claimed in claim 1 characterized in that the upper edge of the limb, which edge faces away from the plate, is designed as a support for the loading floor part formed by the folded-over backrest part of the additional seat.

10. A covering module for installation in a vehicle, the vehicle having a rear loading space with a floor trough and an additional seat which is arranged in the rear loading space and has a pivotable seat part and pivotable backrest part, the rear sides of which, which face away from the seat surface, forming a flat loading floor in the folded-down not-in-use position of the additional seat, characterized by a self-supporting, flat plate which is used as a footrest for a vehicle occupant sitting on the additional seat, said plate being able to cover the floor trough in the foot region of the additional seat, and by a strip-shaped, narrow limb which is angled integrally on the one longitudinal side of the plate and has a minimum width which is matched to the vertical size of the seat part, for the purpose of accommodating the seat part when folded over.

11. The covering module as claimed in claim 10, characterized in that holding means for accommodating objects are arranged on the front side of the limb, which side at least on of faces the plate, and positioned on the lower side of the plate.

12. The covering module as claimed in claim 10, characterized in that a supporting surface which runs around the edge of the plate and is recessed in the region of the limb is formed on the plate.

13. The covering module as claimed in claim 11, characterized in that storage trays, which can be slidably pulled out or pushed in, are arranged on the lower side of the plate.

14. The covering module as claimed in one of claim 10, characterized in that the plate has at least one fastening hole for passing a screw connection through, and in that a longitudinal groove is incorporated centrally in the plate said longitudinal groove running transversely with respect to the extent of the limb and extending with a defined length from the at least one fastening hole to the limb.

15. The covering module as claimed in claim 10, characterized by it being produced from sheet metal or plastic.

16. The covering module as claimed in claim 6 wherein the longitudinal groove is incorporated into the plate on an upper side which faces away from the longitudinal strut.

17. The covering module as claimed in claim 14 wherein the longitudinal groove is incorporated on an upper side of the plate.

* * * * *